March 4, 1958  T. W. KALBOW  2,825,270
ADJUSTABLE TRACING DEVICE FOR MACHINES
Filed Oct. 28, 1954  3 Sheets-Sheet 1
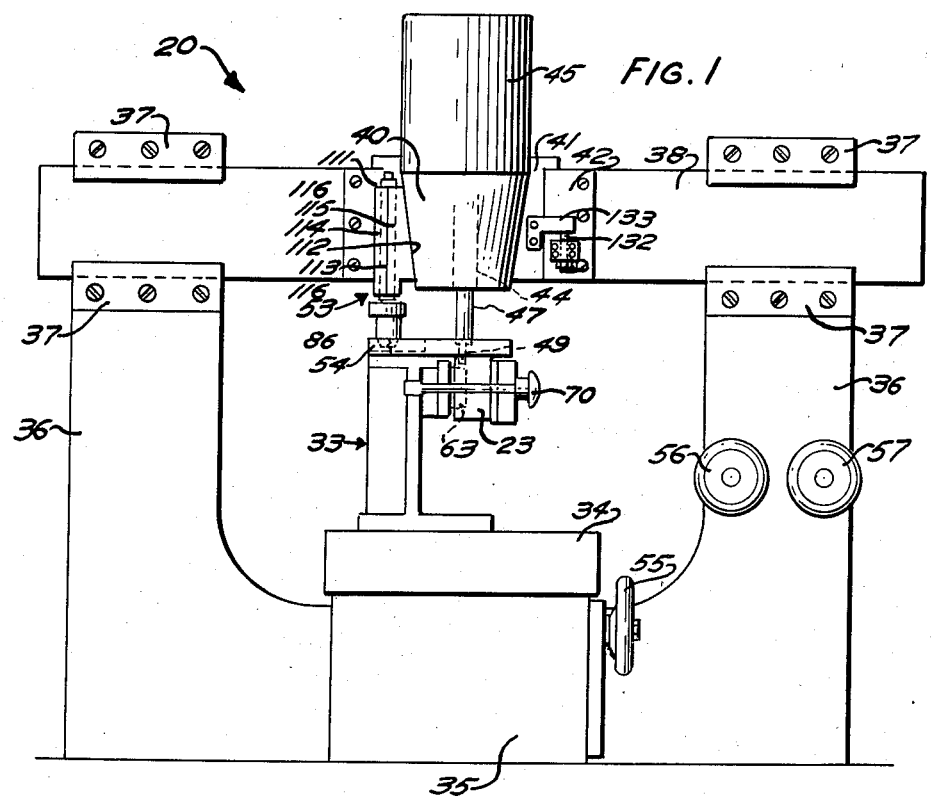
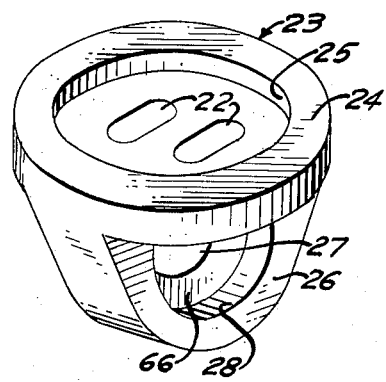
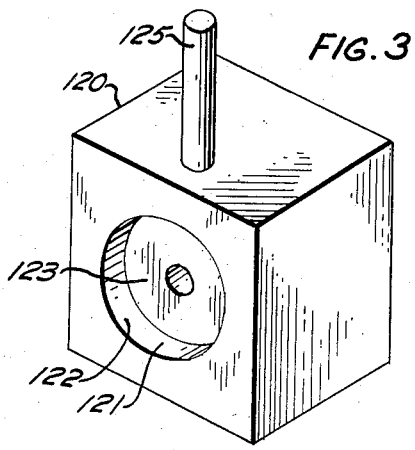
INVENTOR
T. W. KALBOW
BY C. B. Hamilton
ATTORNEY

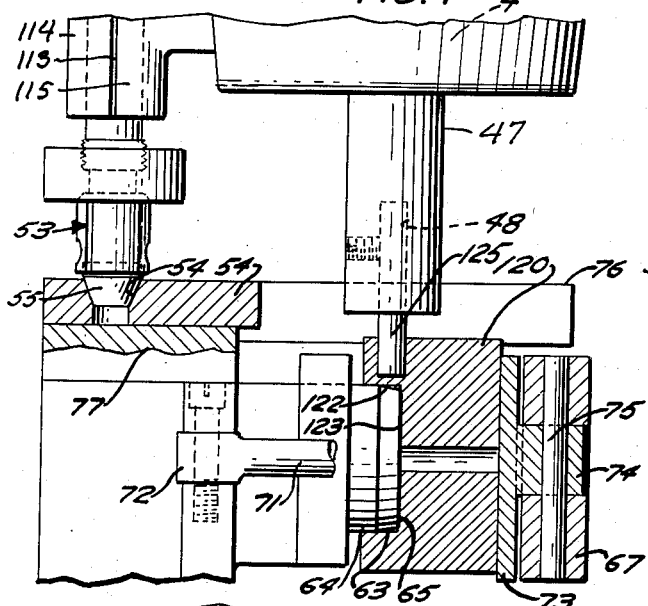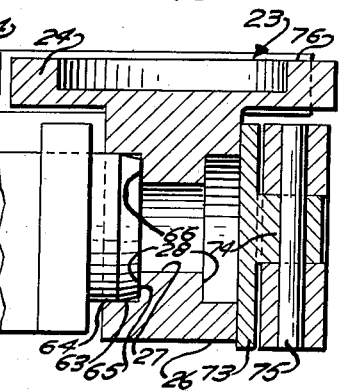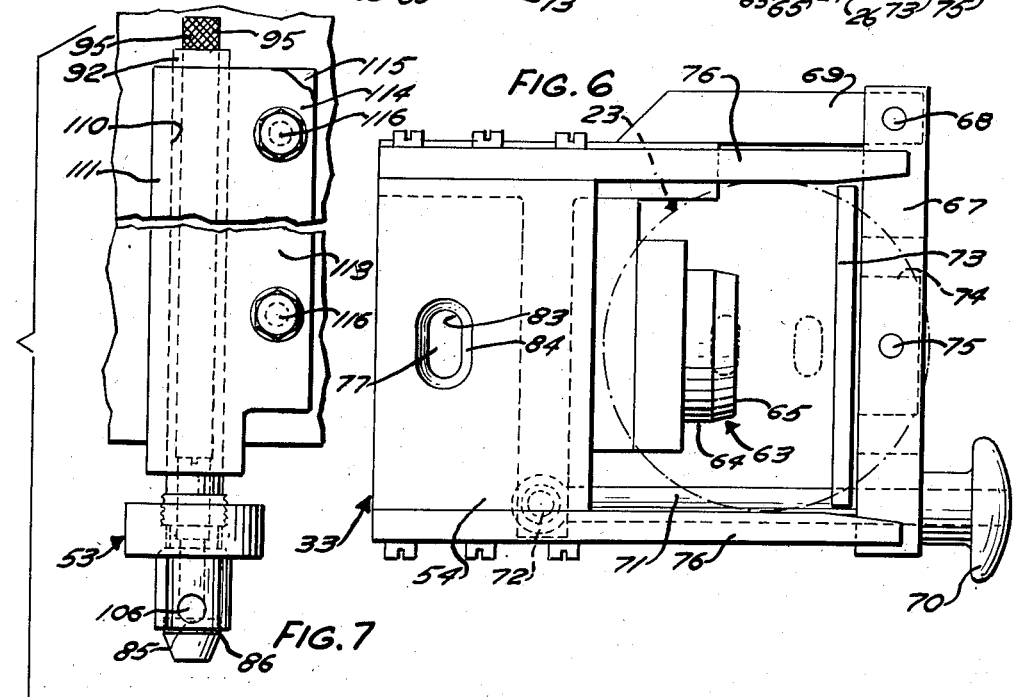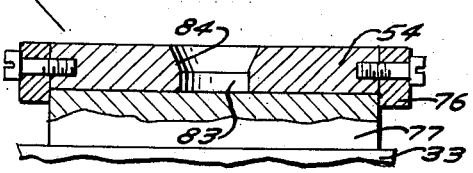

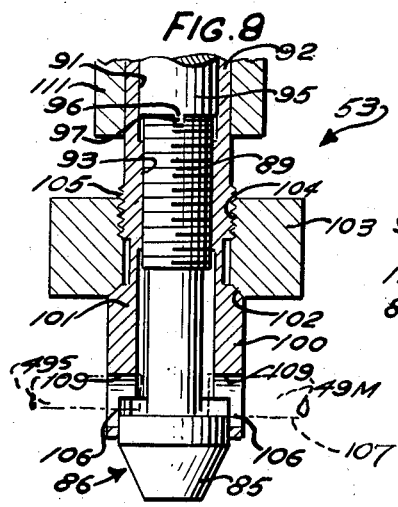

United States Patent Office 2,825,270
Patented Mar. 4, 1958

2,825,270

ADJUSTABLE TRACING DEVICE FOR MACHINES

Theodore W. Kalbow, Chicago, Ill., assignor to Western Electric Company, Incorporated, New York, N. Y., a corporation of New York Application October 28, 1954, Serial No. 465,275

4 Claims. (Cl. 90—13)

This invention relates to duplicating devices for cutting machines and more particularly to such devices having adjustable tracing units.

An object of the present invention is to provide an adjustable tracing attachment for cutting machines.

Another object of the invention is to provide a tracing unit and cooperating template for use in a cutting machine and capable of being adjusted for cutting tools of different sizes.

A device illustrating certain features of the invention as applied to a cutting apparatus having a cutter head and cutting tool movable vertically and laterally and a work holder movable longitudinally may include an adjustable tracing unit mounted on the cutting head for movement therewith and having a conical follower engageable with a beveled guiding surface of a horizontally disposed template fixed to the work holder for guiding the tracing unit and the cutting tool through a predetermined path relative to the work to cut the work along a predetermined cutting line. The conical-shaped follower is adjustably mounted for vertical movement in a supporting member of the tracing unit and has a gaging surface in spaced relation to a gaging surface on the supporting member for receiving a gage or a cutter of a predetermined maximum size therebetween for setting the conical follower in a predetermined first position on the supporting member, after which the follower is clamped in said first position by suitable clamping means. The cutting head is lowered to a predetermined cutting level and oriented relative to the work piece, in which position of the cutting head the conical follower is seated against the beveled surface of the template and the tracing unit is clamped in this position to the cutter head for use with said maximum sized cutter.

If it is desired to use a smaller cutter, the follower is loosened in the supporting member and the smaller cutter is placed between the gaging surfaces of the follower and the supporting member and the follower is moved upwardly to the extent permitted by the smaller cutter to a second position, after which the follower is clamped to the supporting member in said second position and the cutter removed from the tracing unit and secured in the cutter head. With the cutter rotating, the cutter head is lowered to said predetermined cutting level to cause the smaller cutter to cut a hole in a work piece clamped in said work holder, and the cutter head is then moved laterally to cause the follower to engage the beveled surface of the template to be guided thereby. The angle of the conical surface of the follower and of the beveled guiding surface of the template are such that when the follower is raised to its second position sufficient clearance is provided permitting the follower to move laterally into engagement with the beveled surface of the template a distance equal to the difference between the radii of the maximum sized and the smaller sized cutters and thereby align the cutting edge of the smaller cutter with the predetermined cutting line of the work piece.

Other objects and advantages of the invention will become apparent by reference to the following detailed description and the accompanying drawings illustrating a preferred embodiment thereof, in which—

Fig. 1 is a front elevational view of a cutting machine with a duplicating tracing unit attached thereto;

Fig. 2 is a perspective view of a work piece or piece part in which a pair of slots are to be cut;

Fig. 3 is a perspective view of a master setup element for use in setting up the apparatus;

Fig. 4 is an enlarged fragmentary vertical sectional elevational view of the apparatus with the master setup element therein;

Fig. 5 is a fragmentary vertical sectional view similar to a portion of Fig. 4 showing the work piece clamped in the work holder;

Fig. 6 is a plan sectional view of the work holder showing the work piece in position therein in dotted lines;

Fig. 7 is a fragmentary sectional view showing the adjustable tracing unit mounted on the cutting head and in spaced relation to the profiling template mounted on the work holder;

Fig. 8 is an enlarged fragmentary vertical sectional view of the tracing unit;

Fig. 9 is a plan sectional view of the tracing unit taken on the line 9—9 of Fig. 8;

Fig. 10 is a detailed view of several of the components of the tracing unit in separated relation with portions thereof broken away; and Figs. 11 and 12 are enlarged fragmentary diagrammatic views showing the tracing unit and cutting tools in different positions.

The profile cutting apparatus 20 selected to illustrate one embodiment of the present invention is designed to cut or mill a pair of slots 22 (Fig. 2) in a work piece 23 which has a circular disc portion 24 with a central recess 25 therein and a transversely extending portion 26 provided with a bore 27 and a pair of counterbores 28.

The work piece 23 is clamped in a work holder 33 on a table 34 which is mounted for longitudinal horizontal movement on a bed 35 of the profiling apparatus. A pair of upright frame members 36 have guides 37 thereon for supporting a cross slide 38 for horizontal transverse movement, and a cutter head 40 secured to a slide 41 is mounted on the cross slide 38 for vertical movement in guides 42. The cutter head 40 has a spindle 44 and a drive motor 45 therefore and the spindle 44 has a chuck 47 or other means provided with a socket 48 in which the shank of an end mill cutter 49 may be secured by any suitable means. An adjustable tracing unit 53 is secured to the cutter head 40 for movement therewith and a horizontal template 54 (Figs. 1, 4, and 5) cooperable with the tracing unit is secured to the work holder 33.

The table 34, the cross slide 38, and the vertical slide 41, are reciprocable in their respective directions under control of manually operated control elements 55, 56, and 57 for effecting relative movement between the cutter 49 and the work piece 23 in a well-known manner.

The work holder 33 has a circular seat 63 (Figs. 4–6) extending laterally therefrom adapted to fit into one of the counterbores 28 of the work piece 23 and having a cylindrical surface 64 engageable with the cylindrical surface of the counterbore 28 having an end surface 65 engageable with the shoulder 66 of the work piece 23. The work piece 23 is clamped against the seat 63 by a hinged clamping member 67 pivoted at 68 to a fixed hinge member 69 secured to the holder 33, and the clamping member 67 is mounted in clamping position by a hand wheel 70 threadedly and adjustably mounted on one end of a rod 71, the other end of which is pivotally supported at 72 on the work holder 33. A pressure equalizing plate 73 which has a lug 74 fitting in an aperture in the clamping member 67 and pivotally connected thereto at 75 is adapted to engage one face of the transverse portion 26 of the work piece 23 and in cooperation with the clamping member 67 clamp the work piece onto the seat 63 of the work holder. The circular portion 24 of the work piece is engaged in opposite sides by a pair of parallel positioning arms 76 (Fig. 6) for holding the work piece 23 in a predetermined angular position on the seat 63 with the disc portion 24 thereof disposed horizontally. The positioning arms 76 are fixed to opposite ends of the template 54 which is in the form of a plate secured to a pad 77 on the upper portion of the work holder 33.

The template 54 has an elongated opening or slot 83 therein with beveled guide or profiling surfaces 84 adapted to cooperate with the sloping or conical surfaces 85 of a follower member 86 forming a part of the adjustable tracing unit 53. The enlarged lower end of the follower 86 forms a head with a flat annular shoulder or gaging surface 88 (Figs. 10–12) and a threaded shank 89 extending upwardly therefrom and is adjustably mounted within a bore 91 (Fig. 8) of a supporting sleeve 92 forming a part of the tracing unit. The sleeve 92 has an internally threaded portion 93 engaging the threaded shank 89 and has a counterbore 94 (Fig. 10) in the lower end thereof for receiving the head of the follower. An adjusting rod or tool 95 rotatably supported within the sleeve 92 has a tongue 96 at its lower end engageable in a slot 97 in the upper end of the shank 89 of the follower and has a knurled upper end thereof projecting above the sleeve 92, whereby it may be engaged by the operator and turned to adjust the follower 86 vertically relative to the supporting sleeve 92.

At its lower end the sleeve 92 is longitudinally slotted at 99, 99 to provide a plurality of yieldable fingers 100 actuatable into engagement with the head of the follower for clamping it in adjusted position. The fingers 100 have upper conical cam surfaces 101 which are engageable with an annular cam surface 102 on a collar 103 which has an internally threaded portion 104 engageable with the externally threaded portion 105 of the sleeve 92. The lower portion of the sleeve 92 and the collar 103 forms a collet shuck which may be actuated by rotating the collar 103 to cause the gripping fingers 100 to release or grip the follower 86.

The lower end of the sleeve 92 has a transversely disposed cylindrical aperture 106 formed therein extending diametrically through a pair of fingers 100 adjacent the lower ends thereof for receiving a setup gage 107 or end mill cutters 108. The setup gage 107 (or cutter 49) may be inserted in one of the apertures 106 and moved upwardly with the side thereof in engagement with the upper gaging surface 109 of aperture 106 and the follower 85 is rotated with a micrometer feel to raise the gaging surface 88 of the follower into engagement with the lower surface of the setup gage (or cutter) and the collar 103 tightened to lock the follower in a predetermined set position in the supporting sleeve 92 of the tracing unit 53. In this manner the follower may be adjusted in the tracing unit to various positions, according to the size of cutter used, for cooperation with the bevel surfaces 84 of the template 54 to permit the use of cutters of different sizes of cutting the work piece along a predetermined cutting line.

The sleeve 92 of the tracing unit 53 is slidably mounted in the bore 110 of a bracket 111 in vertical alignment with the slot 83 of the template 54. The bracket 111 is secured to the cutting head and has a slot 113 (Figs. 1, 4, and 7) therein extending into the bore 110 to form a clamping flange 114 which is adapted to be moved toward a cooperating flange 115 by a pair of clamping screws 116. After the follower 86 has been adjusted to and secured to the sleeve 92 in its first position the clamping screws 116 are loosened and the tracing unit 53 is lowered into engagement with the template 54 to cause opposite sides of the conical surface 85 of the follower 86 to contact two portions of the beveled surface 84, after which the clamping screws 116 are tightened to clamp the supporting sleeve 92 and the tracing unit 53 to the bracket 111.

As a first step in setting up the apparatus, a master setup element 120 (Figs. 3 and 4) is clamped to the holder 33 with the seat 63 inserted in a recess 121 in the setup element and with the surfaces 64 and 65 of the seat 63 engaging surfaces 122 and 123 in the recess 121 of the element (Fig. 4). The setup element 120 has an aligning pin 125 which is positioned vertically upwardly for engaging the spindle chuck 47 in the tool socket 48 thereof for orienting the cutter head 40 and spindle 44 in a predetermined relation to the work holder 33 and the work piece to be clamped thereon so that a cutter 49M (Fig. 11) of a predetermined maximum size equal to the width of the slot 22 may be set in the spindle chuck 47 and the peripheral cutting edges of the cutter 49M will be in a position to cut the work piece along both of the predetermined cutting lines 128 of the work piece.

After the cutter head 40 and the spindle 44 have been aligned by the master setup element 120, the cutter head may be raised and the setup element 120 removed from the work holder 33. The locking collar 103 of the tracing unit is unscrewed to release the follower 86 and the cylindrical setup plug 107 having a diameter the same as that of the maximum sized cutter 49M is inserted in the aperture 106 in the sleeve 92 in engagement with the upper gaging surface 109, and the follower 86 is rotated by means of the adjusting rod 95 to elevate the gaging surface 88 thereof into contact with the lower surface of the setup plug 107 to set the follower 86 in a predetermined first position on the sleeve 92, after which the locking collar 103 is turned to lock the follower in said first position.

The cutter head 40 is then lowered to a predetermined position so that a cutter 49 when secured thereto will cut to the desired depth in the piece part 23, and an adjustable stop 132 on a guide 42 of the cross slide 38 is set to engage a stop 133 on the slide 41 and stop the cutting head and the cutter 49 at the desired position. The bracket 111 is first loosened by loosening the screws 116 and the follower 86 moved downwardly with the conical surface 85 thereof in engagement with the beveled surfaces 84 of the template. The clamping screws 116 are then tightened to clamp the tracing unit 53 in this position. The cutter head 40 may then be raised and a work piece 23 clamped in a position on the holder 33 preparatory to the cutting operation.

If the cutter 49M of maximum size equal in diameter to the exact width of the slot 22 is used it will cut simultaneously along both of the predetermined cutting lines 128 of the work piece and cut the slot 22 in one straight movement of the work relative to the cutter. However, if the cutter of said predetermined maximum size is not available, other cutters of smaller sizes may be used and the follower 86 of the adjustable tracing unit 53 may be set to position the cutters of smaller size in positions so that they will follow and cut along successive portions of the cutting lines 128 of the slot 22 in the work piece. To use an available cutter 49S of smaller size than the maximum sized cutter 49M the cutter head 40 is raised and the locking collar 103 of the tracing unit 50 is turned to loosen the follower 86, and the end of the smaller cutter 49S is inserted in the aperture 106 in the sleeve 92 and positioned against the upper gage surface 109 thereof after which the follower 86 is rotated by means of the adjusting tool 95 to move the gaging surface 88 of the follower into engagement with the lower surface of the smaller cutter 49S with a pressure similar to that used in measuring articles with a micrometer to set the follower in a predetermined second position in the sleeve 92 of the tracing unit. The locking collar 103 is then tightened to clamp the follower 86 in said second position and the cutter 49S is removed from the tracing unit 53 and secured in the socket 48 of the spindle chuck 47. The motor 45 is started and the cutter head 40 is lowered to its cutting position with the stop 133 in engagement with the cooperating stop 132, causing the cutter 49S to mill a hole in the work piece 23. With the cutter head 40 in its lowermost position the follower 86, because it is in its second position in the tracing unit will be disposed above its former first position a distance X (Fig. 11) equal to the difference between the diameter of the maximum size cutter 49M and the selected available smaller sized cutter 49S. The raising of the follower 86 this distance X provides a clearance between the conical surface 85 of the follower and the beveled surfaces 84 of the template 54 and the angle of the beveled profiling surfaces 84 and the conical surface 85 is such (26° 34′ from the vertical) as to permit a lateral traverse of the follower through a distance equal to ½X to engage the conical surface 85 of the follower 86 with the beveled surface 84 of the template. This lateral traverse of ½X of the cutting head 40 and the smaller cutter 49S is equal to the difference in radii between the cutters 49M and 49S and will align the periphery of the smaller cutter 49S with the cutting line 128 of the work piece 33 as indicated diagrammatically in Fig. 12. The apparatus may then be manipulated to effect relative horizontal movement between the cutter 49S and the work piece 23 and to engage the follower 86 with the horizontally disposed beveled guiding surface 84 of the template 54 and effect movement of the follower along successive portions thereof to cause the cutter 49S to follow a predetermined path and cut along the cutting line 128 of the work piece. In this manner the smaller cutter 49S cuts along successive portions of the cutting line 128 in the work piece 23 and follows it through a predetermined path according to the movement of the follower 86 along the beveled profiling surface 84 of the template.

When one slot 22 has been cut the work piece 23 is removed from the work holder 33 rotated horizontally through one-half turn, reclamped to the work holder and the second slot 22 is cut therein.

While in the embodiment of the invention disclosed herein opposite sides of the follower 86 are shown as engaging and being contacted by two portions of the beveled profiling surface 84 (Fig. 11) during the setting up of the apparatus, when the apparatus is used for cutting a work piece along cutting lines of a different configuration and a template is used having a different pattern of beveled profiling surfaces 84, it will be understood that the tracing unit 53 will be lowered into engagement with the template 54 and the conical follower 86 will engage only a single portion of the profiling surface 84 to establish the setting of the follower 86 to its first position for a cutting operation of the apparatus with the maximum sized cutter. When a cutter smaller than said maximum sized cutter is to be used the follower 86 is adjusted on the supporting sleeve 92 to its second position in the same manner described above.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for controlling the movement of one body relative to a second body, the combination of a tracing member capable of being operatively connected to said one body for simultaneous movement therewith parallel to a predetermined plane, a follower having a conical surface mounted on said tracing member for movement therewith and for movement relative thereto in a direction perpendicular to said plane, a template capable of being mounted in fixed relation to said second body and parallel to said plane and having a track of a predetermined configuration with a beveled surface disposed obliquely to said plane and engaging said follower for guiding the tracing member through a predetermined path parallel to said plane, and means for adjusting the position of said follower on said tracing member along said direction to effect lateral adjustment of the tracing member relative to the template.

2. A tracing device for a machine using a cutter which comprises a template having a guide track with a beveled surface of a predetermined contour, a follower having a conical surface engageable with the beveled surface of said template and having a threaded shank, a member having a threaded portion engageable with the threaded shank of said follower for supporting the follower for adjustable movement in a direction perpendicular to the template, said follower having a gaging surface disposed parallel to the template, said supporting member having a gaging surface disposed parallel to the template and cooperable with the gaging surface on the follower for engaging opposite sides of a cutter positioned therebetween to set the follower in a predetermined position on the supporting member in accordance with the size of the cutter to be used, means for rotating the follower to adjust it in said direction to obtain a proportional lateral adjustment of the follower and the supporting member relative to the template, and means for securing the follower in adjusted position on the supporting member.

3. In a work cutting apparatus using a cutter and having a work holder and a cutter holder, a device for controlling the relative movement between the work holder and the cutter holder which comprises a tracing member operatively connected to the cutter holder for movement therewith parallel to a predetermined plane, a follower having a conical surface mounted on the tracing member for movement therewith and for movement relative thereto along an axis perpendicular to the plane, a template mounted in fixed relation to the work holder and parallel to said plane and having a beveled guide surface of predetermined configuration for engaging the conical surface of the follower and guiding the tracing member through a predetermined path parallel to said plane, means for adjusting the follower on the tracing member along said axis to obtain a predetermined lateral adjustment of the tracing member relative to the template, and gaging surfaces on said tracing member and on said follower engageable with opposite sides of the cutter to be used in the apparatus for setting the follower in a predetermined position on the tracing member in accordance with the size of the cutter.

4. In a work cutting apparatus using a cutter and having a work holder and a movable cutter holder, a device for controlling the movement of the cutter holder relative to the work holder which comprises a tracing member operatively connected to the cutter holder for simultaneous movement therewith parallel to a predetermined plane, a rotatable follower having a conical surface, means mounting the follower on the tracing member for movement therewith and for axial movement relative thereto perpendicular to the plane, a template mounted in fixed relation to the work holder and parallel to said plane and having a beveled guide surface of predetermined configuration for engaging the conical surface of the follower to guide the tracing member through a predetermined path parallel to said plane, means for adjusting the follower on the tracing member in an axial direction to effect lateral adjustment of the tracing member relative to the template, gaging surfaces on said tracing member and on said follower engageable with opposite sides of the cutter to be used in the apparatus for locating the follower axially in a predetermined position on the tracing member in accordance with the size of the cutter, and means for releasably securing the follower onto the tracing member in adjusted position.

References Cited in the file of this patent

UNITED STATES PATENTS

| | | |
|---|---|---|
| 1,552,061 | Krebs | Sept. 1, 1925 |
| 2,557,876 | Klema | June 19, 1951 |
| 2,607,989 | Peterson et al. | Aug. 26, 1952 |